(12) United States Patent
Cheng et al.

(10) Patent No.: US 12,053,006 B2
(45) Date of Patent: *Aug. 6, 2024

(54) METHOD AND APPARATUS OF EXTREME VACUUM COOLING

(71) Applicant: Culinary Sciences, Inc., Campbell, CA (US)

(72) Inventors: George Shu-Xing Cheng, Folsom, CA (US); David Kung-Tin Shao, Hong Kong (HK); John Field, Campbell, CA (US); Richard Gillespie, San Jose, CA (US)

(73) Assignee: Culinary Sciences, nc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,567

(22) Filed: Jan. 27, 2023

(65) Prior Publication Data
US 2023/0240340 A1 Aug. 3, 2023

Related U.S. Application Data

(63) Continuation of application No. 17/469,712, filed on Sep. 8, 2021, now Pat. No. 11,638,436.

(51) Int. Cl.
*A23L 3/36* (2006.01)
*F25D 17/04* (2006.01)
*F25D 29/00* (2006.01)

(52) U.S. Cl.
CPC ............ *A23L 3/363* (2013.01); *F25D 17/042* (2013.01); *F25D 29/00* (2013.01); *F25D 2317/043* (2013.01); *F25D 2600/06* (2013.01)

(58) Field of Classification Search
CPC ............ A23L 3/363; A23L 3/36; A23L 3/001; F25D 17/042; F25D 29/00; F25D 2317/043; F25D 2600/06
See application file for complete search history.

(56) References Cited

U.S. PATENT DOCUMENTS 6,014,325 A * 1/2000 Pecore .................... F25D 29/00
62/150
6,090,422 A 7/2000 Taragan et al.
(Continued)

FOREIGN PATENT DOCUMENTS

CH 708608 A2 * 3/2015 ............ F25D 29/00
CN 107192201 A 9/2017
(Continued)

OTHER PUBLICATIONS

CN 111829262 A Translation (Year: 2020).*
(Continued)

*Primary Examiner* — Elizabeth J Martin
*Assistant Examiner* — Dario Antonio Deleon
(74) *Attorney, Agent, or Firm* — Stout, Uxa & Buyan, LLP; Donald E. Stout

(57) ABSTRACT

A method and apparatus is disclosed relating to food preparation in commercial kitchens and food processing plants. The disclosed extreme vacuum cooling (EVC) technology and apparatus can work in ultra low pressure conditions with adaptive pressure control to avoid potential liquid splash inside the vacuum chamber caused by un-controlled low pressure conditions. Clean air is added into the vacuum chamber to allow the chamber pressure to track a setpoint trajectory that may have ramp up periods in order to avoid liquid splash events. The apparatus enables the user to cool various kinds of foods quickly, save energy, and meet food safety regulations.

16 Claims, 8 Drawing Sheets

(56) References Cited

U.S. PATENT DOCUMENTS

| | | | |
|---|---|---|---|
| 10,100,821 B2 * | 10/2018 | Yatsu | ............... F04B 37/08 |
| 2005/0004687 A1 | 1/2005 | Shu-Xing | |
| 2016/0348962 A1 * | 12/2016 | Roekens et al. | ......... F25B 9/14 |
| 2021/0127717 A1 * | 5/2021 | Katsumata et al. | .... B01F 35/92 |

FOREIGN PATENT DOCUMENTS

| | | | | |
|---|---|---|---|---|
| CN | 111829262 A | * | 10/2020 | ............... A23B 4/07 |
| EP | 0393777 A2 | * | 10/1990 | |
| EP | 3473952 A1 | * | 4/2019 | ........... F25D 31/005 |
| JP | 2018-162960 A | | 10/2018 | |
| KR | 10-2008-0094889 A | | 10/2008 | |
| WO | 2007-094141 A1 | | 8/2007 | |

OTHER PUBLICATIONS

CH 708608 A2 Translation (Year: 2015).*
International Search Report and Written Opinion issued on Jan. 6, 2023 by the ISA/KR for corresponding PCT App. No. PCT/US2022/042866.

* cited by examiner

METHOD AND APPARATUS OF EXTREME VACUUM COOLING

INVENTION

This application is a continuation under 35 U.S.C. 120 of U.S. application Ser. No. 17/469,712 filed on Sep. 8, 2021, which is herein expressly incorporated by reference in its entirety.

The subject of this patent relates to food processing and preparation for commercial kitchens and food processing plants. More particularly, this patent relates to a method and apparatus for a new technology called Extreme Vacuum Cooling (EVC). An apparatus built based on EVC can work in extremely low pressure conditions to cool food quickly. In addition, the apparatus is equipped with adaptive pressure control to avoid potential liquid splash inside the vacuum chamber caused by un-controlled low pressure conditions. Clean dry air or inert gas is added into the vacuum chamber so that the chamber pressure can be automatically controlled tracking a pre-determined setpoint trajectory to avoid potential liquid splash.

Cook and chill is essential for food service operations. When food is cooked but not to be served right away, it is important to get the food out of the temperature danger zone quickly. The temperature danger zone is typically defined in the range between 41° F. and 135° F. (5° C. and 57° C.), in which harmful bacteria grow well. Within that zone, bacteria grow even faster between 70° F. and 125° F. (21° C. and 52° C.). Newly cooked food must pass through this temperature danger zone quickly to be safe for future consumption.

The USDA (The U.S. Department of Agriculture), FDA (Food and Drug Administration), and other government agencies endorse HACCP (Hazard Analysis and Critical Control Point) as an effective and rational means of assuring food safety from harvest to consumption. Preventing problems from occurring is the paramount goal for an HACCP system. Relating to the food cook and chill operations, the HACCP regulations require that cooked food be cooled: (1) from 135° F. to 70° F. (57° C. to 21° C.) within two hours, and (2) from 70° F. to 41° F. (21° C. to 5° C.) or lower in the next four hours.

In a commercial kitchen, large amounts of food need to be prepared within certain time limitations. How to cook and chill the food and meet the food safety limitations can be a big challenge. There are commercial products available on the market with different scientific principles to chill food. They include walk-in refrigerators and blast chillers.

In this patent, we disclose a method and apparatus of Extreme Vacuum Cooling (EVC), where an EVC cooler can work at ultra low pressure conditions with adaptive pressure control for processing large amounts of food to meet government food safety regulations, save energy and time, and achieve uniform cooling to retain good food quality. The main differences and unique features and benefits of the novel EVC apparatus are compared with prior arts as listed in Table 1.

TABLE 1

| Item | Prior Art - Walk-in Refrigerator | Prior Art - Blast Chiller | Novel - EVC Cooler |
| --- | --- | --- | --- |
| Scientific Principle | Mechanical compression for heat transfer | Blowing forced cooled air over food | Pressure thermodynamics in ultra low pressure |
| Cooling Temp Range | Down to 40 F. | Down to 40 F. | Down to 32 F. or Below |
| Cooling Behavior | Slow and non-uniform cooling | Faster with non-uniform cooling | Rapid and uniform cooling. |
| Degree of Vacuum | Atmosphere (1.0 ATM) | Atmosphere (1.0 ATM) | Ultra Low Pressure (0.01 ATM) |
| Use of Energy | Medium to High | High | Low |
| Time Savings | Longest | Moderate | Significant |
| Food Quality | Suffers due to Non-uniform cooling | Suffers due to Non-uniform cooling | Good quality due to uniform cooling |
| Food Yield (Weight) Loss | High to moderate | High to moderate | Moderate to low |
| Shelf Life before Bacteria Forms | Worst | Somewhat better than Refrigeration | Much better than Refrigeration |

Walk-in Refrigerators are based on refrigeration technology and are popular in the food industry, where refrigerated cool air transfers the lower temperature to the food surface through convection to cool food. Blast chillers blow a large amount of refrigerated cool air through a fan onto the food surface to accelerate the cooling.

The Extreme Vacuum Cooling (EVC) technology can be defined as vacuum cooling at extremely low pressure conditions with vacuum chamber pressure control and added clean dry air or inert gas.

Vacuum cooling is based on the principle of evaporative cooling, where water will absorb a large amount of heat in order to evaporate from liquid to gas. Water evaporation can happen at any temperature above the freezing point. When the chamber pressure of the EVC apparatus is intentionally reduced, the vapor pressure of the water inside the food can become higher than the chamber pressure, resulting in the rapid conversion of water inside the food into vapor. This water evaporation transfers the energy to cool the food uniformly throughout the entire food substance. The conversion of water into vapor can happen quickly so that the resulting energy transfer can cool the food uniformly and rapidly.

However, if the pressure difference between the chamber pressure and vapor pressure of the water inside the food is too high, excessive bubbling can occur due to rapid evaporation. When the bubbles burst at the food surface, the force of the bubble surface tension can cause a splash inside the chamber. This is not an issue for solid foods, like beef and chicken as the food structure will not come apart when vapor moves through the food into the vacuum chamber. For low viscosity foods, such as soups and sauces, this can be a big issue. We call this a liquid splash event for those low viscosity foods.

In this patent, we define solid foods with high viscosity as Type A Foods, and liquid foods with low viscosity as Type B Foods. For example, Type A Food includes beef, pork, chicken, potatoes, baked foods, and sautéed meats and vegetables. Type B Food includes soup, stews, sauces, and spaghetti in sauce. There can be gray areas for being actual Type A or B Foods. In any case, viscosity will be used in food cooling recipes and chamber pressure setpoint calculations to ensure that the EVC apparatus can cool all type of foods with good and consistent performance.

Aggressive splash events will result in contaminating the vacuum chamber due to coating the interior chamber surfaces and shelving fixtures with food liquids and sauces. It is important to control the chamber pressure carefully for Type B Food so that the pressure difference between the chamber pressure and vapor pressure is managed in an automated way to enable rapid cooling and avoid liquid splash events. Chamber pressure control of the EVC apparatus will be disclosed in Sections B and C of the specification.

To summarize, the commercial walk-in refrigerators and blast coolers are useful but their disadvantages are also clear. The EVC cooler introduced in this patent can work at ultra low pressure conditions with adaptive pressure control for processing large amounts of food to meet government food safety regulations, save energy and time, and achieve uniform cooling to retain good food quality.

The term mechanism is used herein to represent hardware, software, or any combination thereof. The term EVC refers to Extreme Vacuum Cooling defined and described in this patent application. The term EVC Cooler refers to the extreme vacuum cooling apparatus introduced in this patent. The term HMI refers to Human-Machine-Interface that includes a computer screen to allow a user to interact with a device.

In this patent, we define solid food with high viscosity as Type A Food, and liquid food with low viscosity as Type B Food. For example, Type A Food includes beef, pork, chicken, potatoes, baked foods, and sautéed meats and vegetables. Type B Food includes soup, stews, sauces, and spaghetti in sauce.

Without losing generality, all numerical values given in this patent are examples. Other values can be used without departing from the spirit or scope of this invention. The description of specific embodiments herein is for demonstration purposes and in no way limits the scope of this disclosure to exclude other not specially described embodiments of this invention.

DESCRIPTION

A. Apparatus of Extreme Vacuum Cooling

An extreme vacuum cooling apparatus or an EVC cooler that works in extremely low pressure conditions with pressure control and added clean air is illustrated in FIGS. 1 to 6.

Figure 1:
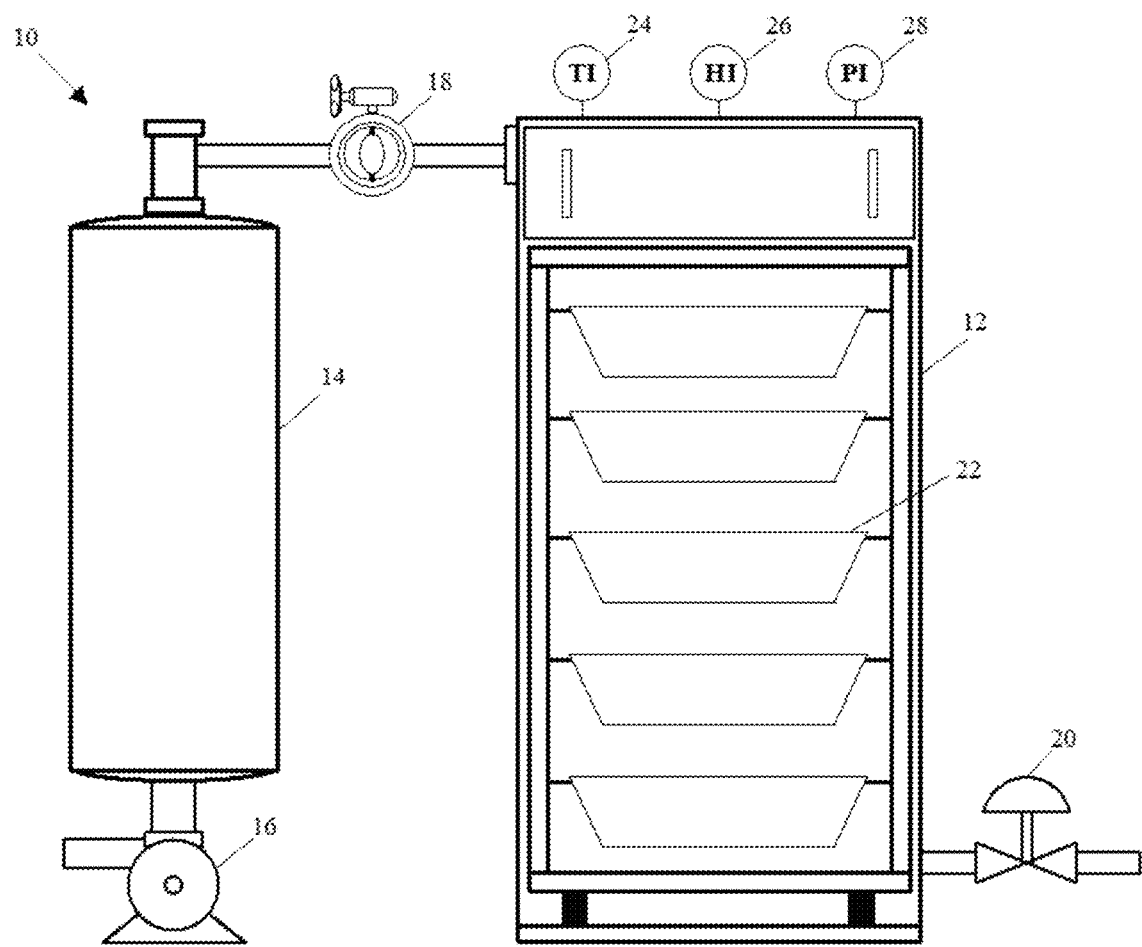
FIG. 1 is a perspective view of an EVC apparatus, according to an embodiment of this invention.

FIG. 1 is a perspective view of an EVC apparatus, according to an embodiment of this invention. The EVC apparatus 10 comprises a food chamber 12, a cold trap 14, a vacuum pump 16, a vacuum control valve 18, an inflow air control valve 20, food pans inside the food chamber 22, temperature sensors 24, a humidity sensor 26, and a pressure sensor 28.

The food chamber 12 is built so that it can work in extremely low pressure conditions. For the purposes of this invention, such extremely low pressure conditions are defined as being less than or equal to about 0.1 ATM or 10 kPa. The cold trap 14 is used to condense water vapor from the food chamber back to liquid form. The vacuum pump 16 can pump air out of the food chamber to reach extremely low pressure conditions.

The vacuum control valve 18 can isolate the cold trap 14 and vacuum pump 16. In addition, the valve can regulate the outflow air when the vacuum pump 16 is running to pump the air out of the food chamber. Therefore, it is used as one of the actuators to control the chamber pressure. The inflow air control valve 20 can regulate the inflow air flow so that it is used as the other actuator for chamber pressure control.

The inflow air control valve 20 can also be used as a vent valve. When it is fully opened, air can enter the food chamber freely so that the chamber pressure can return to atmosphere pressure. This is an important step before opening the chamber door to retrieve food pans.

The food chamber 12 also includes a door that allows easy access to the food chamber and can seal the food chamber from the atmosphere pressure. Since the apparatus can operate at extremely low pressure conditions, the food chamber and its door are specially designed and built to deal with the pressure difference of the atmosphere pressure and 0 Pascal vacuum pressure, which is about 100 kPa.

Inside the food chamber 12, there are multiple racks to hold food pans or trays. The foodstuffs such as meats, vegetables, noodles, and soup are put inside the food pans 22, which are placed inside the food chamber on top of the food pan racks. Standard size food service pans or trays can be used with this apparatus.

The actual temperature sensors, humidity sensor, and pressure sensor are installed inside the food chamber at different locations. For instance, there can be multiple temperature sensor probes that can be inserted to food samples in different food pans to measure the food temperature. The humidity probe and pressure sensor probe are typically installed at the top of the food chamber.

Figure 2:
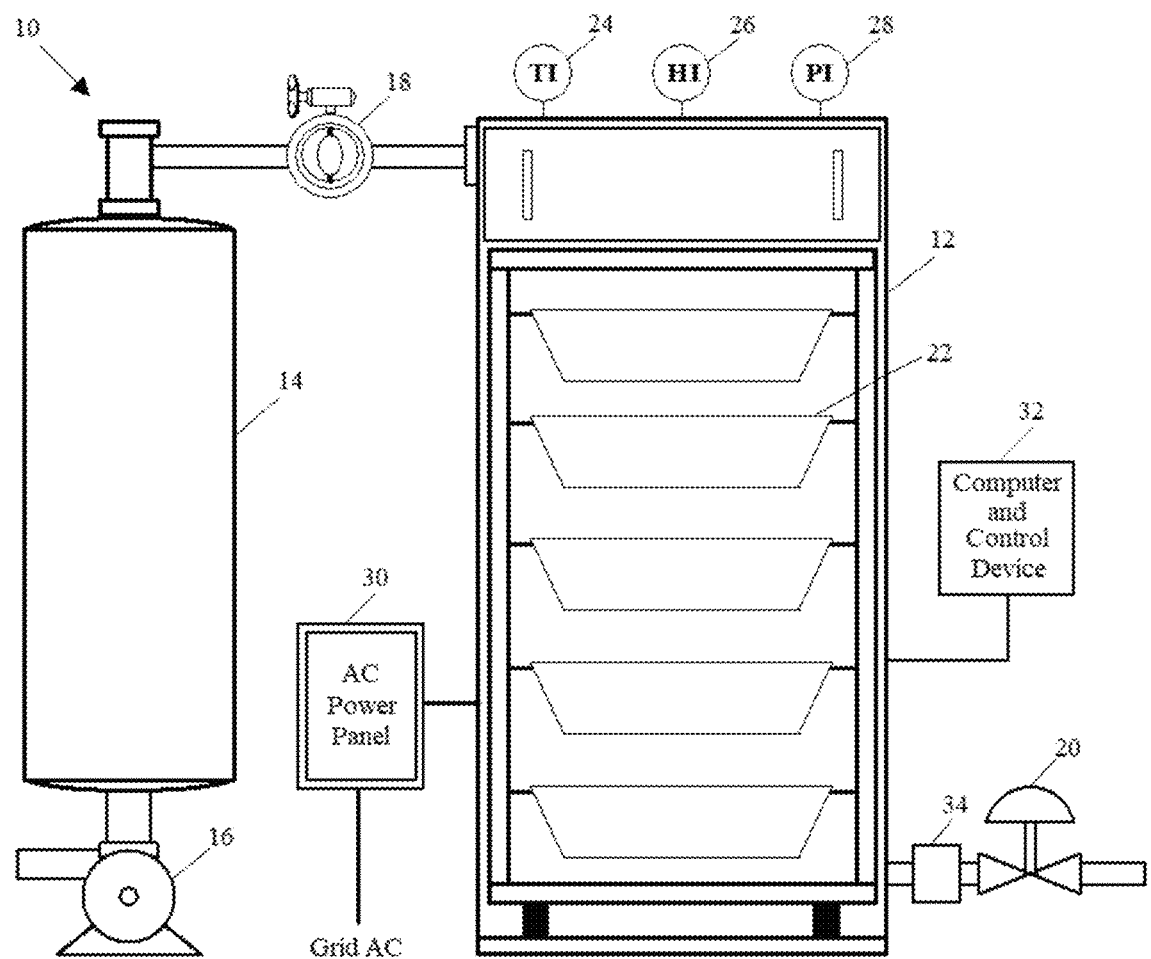
FIG. 2 is a perspective view of an EVC apparatus including more key components, according to an embodiment of this invention.

FIG. 2 is a perspective view of an EVC apparatus including more key components, according to an embodiment of this invention. The EVC apparatus 10 comprises a food chamber 12, a cold trap 14, a vacuum pump 16, vacuum control valve 18, an inflow air control valve 20, food pans inside the food chamber 22, temperature sensors 24, a humidity sensor 26, a pressure sensor 28, an electrical panel and circuit breaker 30, a computer and control device 32, and an inline air filter 34.

The components 12, 14, 16, 18, 20, 22, 24, 26, and 28 have been described in FIG. 1. The electrical panel and circuit breaker 30 can receive electric power and supply the power to run the apparatus. The computer and control device 32 are used to provide adaptive pressure control and logic control for the apparatus and human-machine-interface (HMI) to allow the user to operate the apparatus. The inline air filter 34 is used to filter the inflow air so that it is clean for the food chamber.

Since the apparatus is for the global market, different electric standards in the world can be supported. Therefore, the apparatus can be designed to take either 3-phase AC power or single-phase AC power from the local electric grid.

Figure 3:
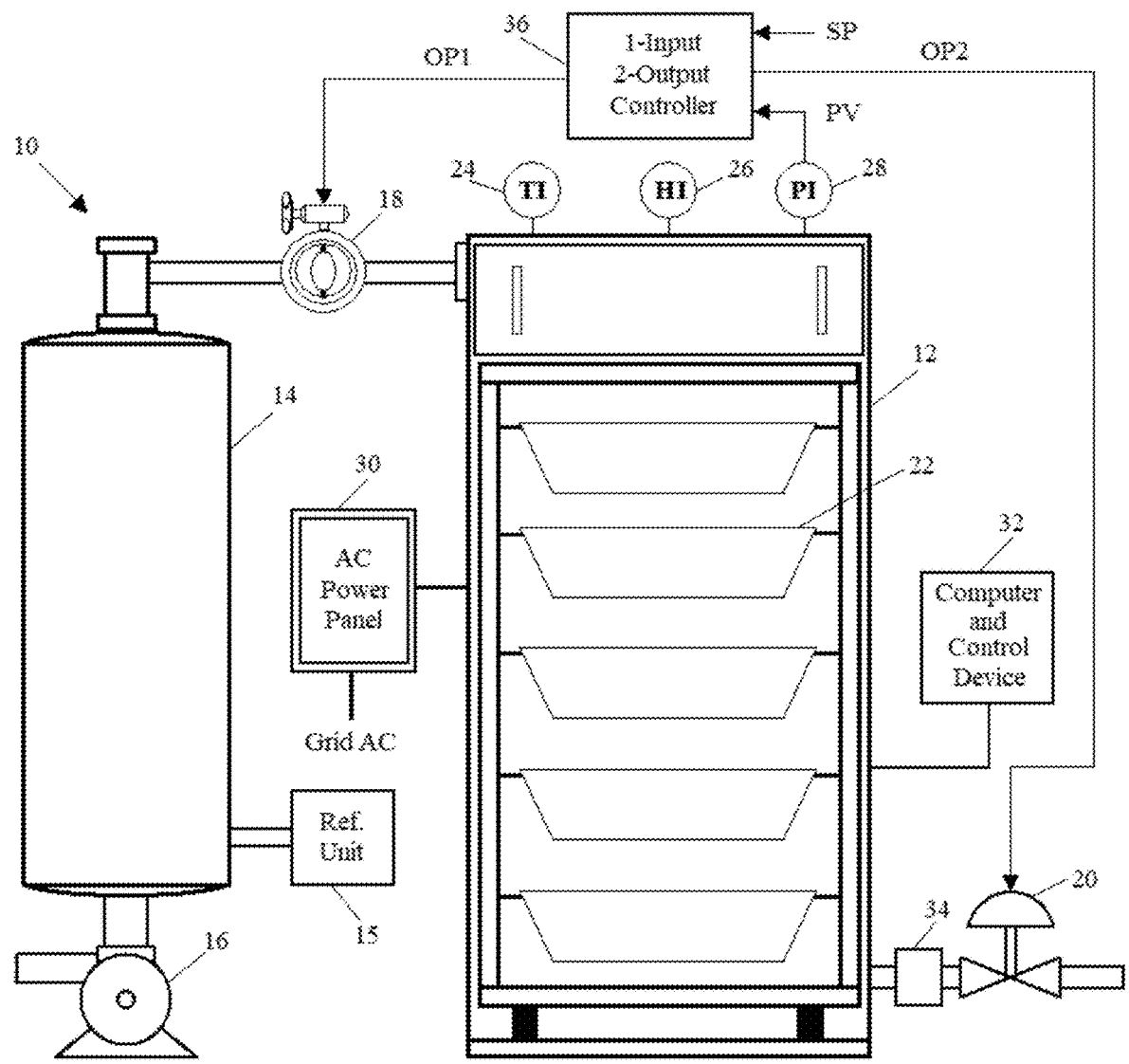
FIG. 3 is a diagram of the EVC apparatus showing all major components with a pressure control system, according to an embodiment of this invention.

FIG. 3 is a diagram of the EVC apparatus showing all major components with a pressure control system, according to an embodiment of this invention. The EVC apparatus 10 comprises a food chamber 12, a cold trap 14, a refrigeration unit 15, a vacuum pump 16, a vacuum control valve 18, an inflow air control valve 20, food pans inside the food chamber 22, temperature sensors 24, a humidity sensor 26, a pressure sensor 28, an electrical panel and circuit breaker 30, a computer and control device 32, an inline air filter 34, and a 1-Input-2-Output controller 36.

The components 12, 14, 16, 18, 20, 22, 24, 26, 28, 30, and 32 have been described in FIGS. 1 and 2. The refrigeration unit 15 is used to cool down the cold trap 14 to condense water vapor. The 1-Input-2-Output controller 36 is used for adaptive pressure control for the food chamber. In order to avoid liquid splash, it is important to control the chamber pressure under a pre-determined pressure setpoint trajectory that is calculated based on food types, viscosity, chamber pressure, food temperature, and boiling point temperature. The pressure control system is described in more details in FIG. 4.

B. Adaptive Chamber Pressure Control for the EVC Apparatus

Figure 4:
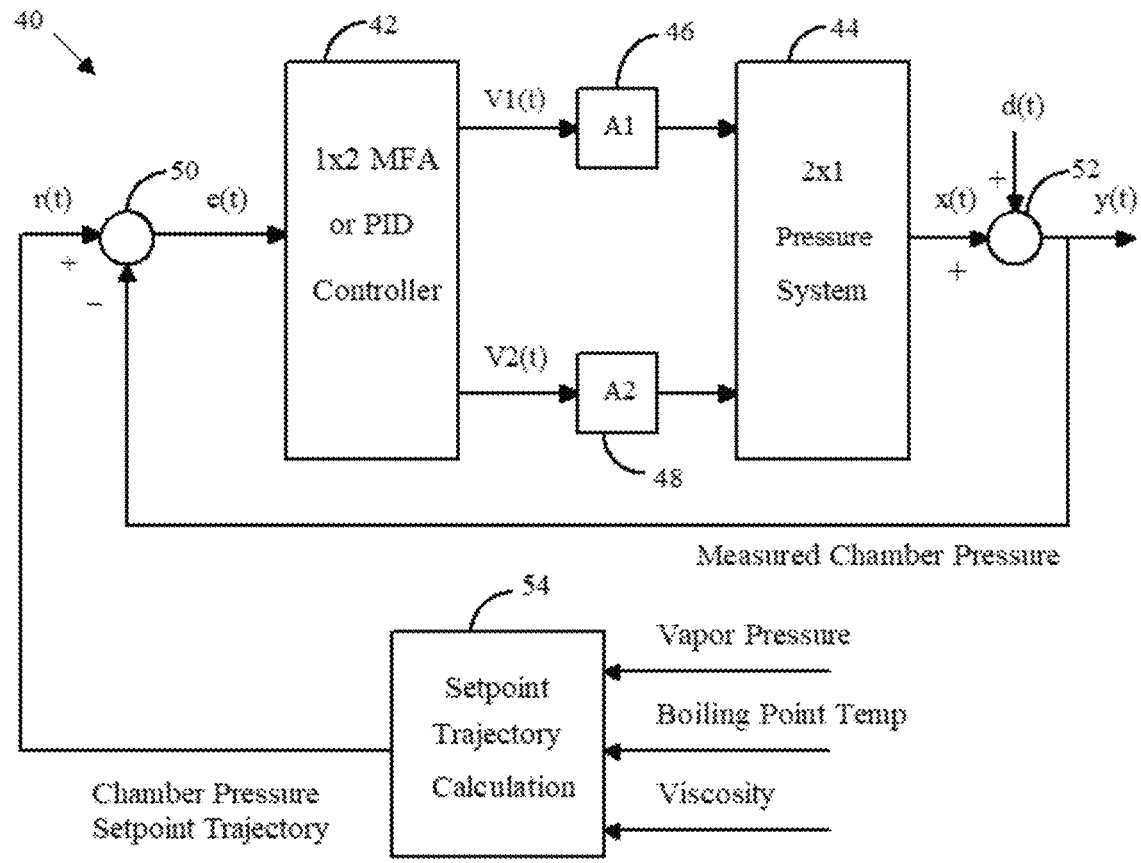
FIG. 4 is a diagram of a 2-Input-1-Output (2×1) pressure control system to control the chamber pressure of the EVC apparatus, according to an embodiment of this invention.

FIG. 4 is a diagram of a 2-Input-1-Output (2×1) pressure control system, according to an embodiment of this invention. The 2-Input-1-Output (2×1) pressure control system 40 comprises a 1-input-2-output (1×2) MFA controller 42, a 2-input-1-output (2×1) system 44, actuator $A_1$ 46, actuator $A_2$ 48, signal adders, 50, 52, and a setpoint trajectory calculation mechanism 54. The signals shown in FIG. 4 are as follows:

r(t)—Setpoint.
y(t)—Measured Variable or the Process Variable, y(t)=x(t)+d(t).
x(t)—System Output.
$V_1$(t)—Controller Output 1 to manipulate Actuator $A_1$.
$V_2$(t)—Controller Output 2 to manipulate Actuator $A_2$.
d(t)—Disturbance, the disturbance caused by noise or load changes.
e(t)—Error between the Setpoint and Measured Variable, e(t)=r(t)−y(t).

The control objective is for the controller to produce outputs $V_1$(t) and $V_2$(t) to manipulate actuators $A_1$ and $A_2$ so that the measured variable y(t) tracks the given trajectory of its setpoint r(t) under variations of setpoint, disturbance, and process dynamics. In other words, the task of the controller is to minimize the error e(t) in real-time.

Automatic control of the chamber pressure of the EVC apparatus can be a challenge when using a traditional control method. We have to control the chamber pressure based on a varying pressure setpoint trajectory. In addition, the same pressure control system has to deal with varying food types, payload changes, and other uncertainties. Fundamentally, the 1×2 pressure controller has only 1 input, which is the control error e(t) but has to produce 2 control outputs $V_1$(t) and $V_2$(t) to manipulate 2 actuators, the vacuum control valve and the inflow air control valve, simultaneously.

In U.S. Pat. No. 7,142,626, Apparatus and Method of Controlling Multi-Input-Single-Output Systems, a 2-Input-1-Output (2×1) Model-Free Adaptive (MFA) control system is described. The Model-Free Adaptive (MFA) control technology as described in U.S. Pat. Nos. 7,142,626, 6,055,524, and 6,556,980 is an artificial intelligence (AI) technology that uses an artificial neural network (ANN) as a key component of the controller.

Model-Free Adaptive (MFA) control, as its name suggests, is an adaptive control method that does not require process models. Based on the intelligent nature of artificial neural networks, MFA can adapt to new operating conditions and control complex systems without requiring process models. MFA controllers can control tough processes including nonlinear, open-loop oscillating, multivariable, and processes with large time delays, varying dynamics, and changing operating conditions. Once commissioned, no controller manual tuning is required.

A Model-Free Adaptive control system has the following properties or features: (1) No precise quantitative knowledge of the process is available; (2) No process identification mechanism or identifier is included in the system; (3) No controller design for a specific process is needed; (4) No complicated manual tuning of controller parameters is required; and (5) Stability analysis criteria are available to guarantee the closed-loop system stability.

In this 2×1 control application, the following objective function is selected for the pressure control system as $$E_S(t) = \frac{1}{2}e(t)^2 \qquad (1)$$
$$= \frac{1}{2}[r(t) - y(t)]^2.$$

The minimization of $E_S$(t) is achieved by (i) the regulatory control capability of the MFA controller, whose outputs $V_1$(t) and $V_2$(t) manipulate the manipulated variables forcing the process variable y(t) to track its setpoint r(t); and (ii) the adjustment of the MFA controller weighting factors that allow the controller to deal with the dynamic changes, large disturbances, and other uncertainties of the control system.

Figure 5:
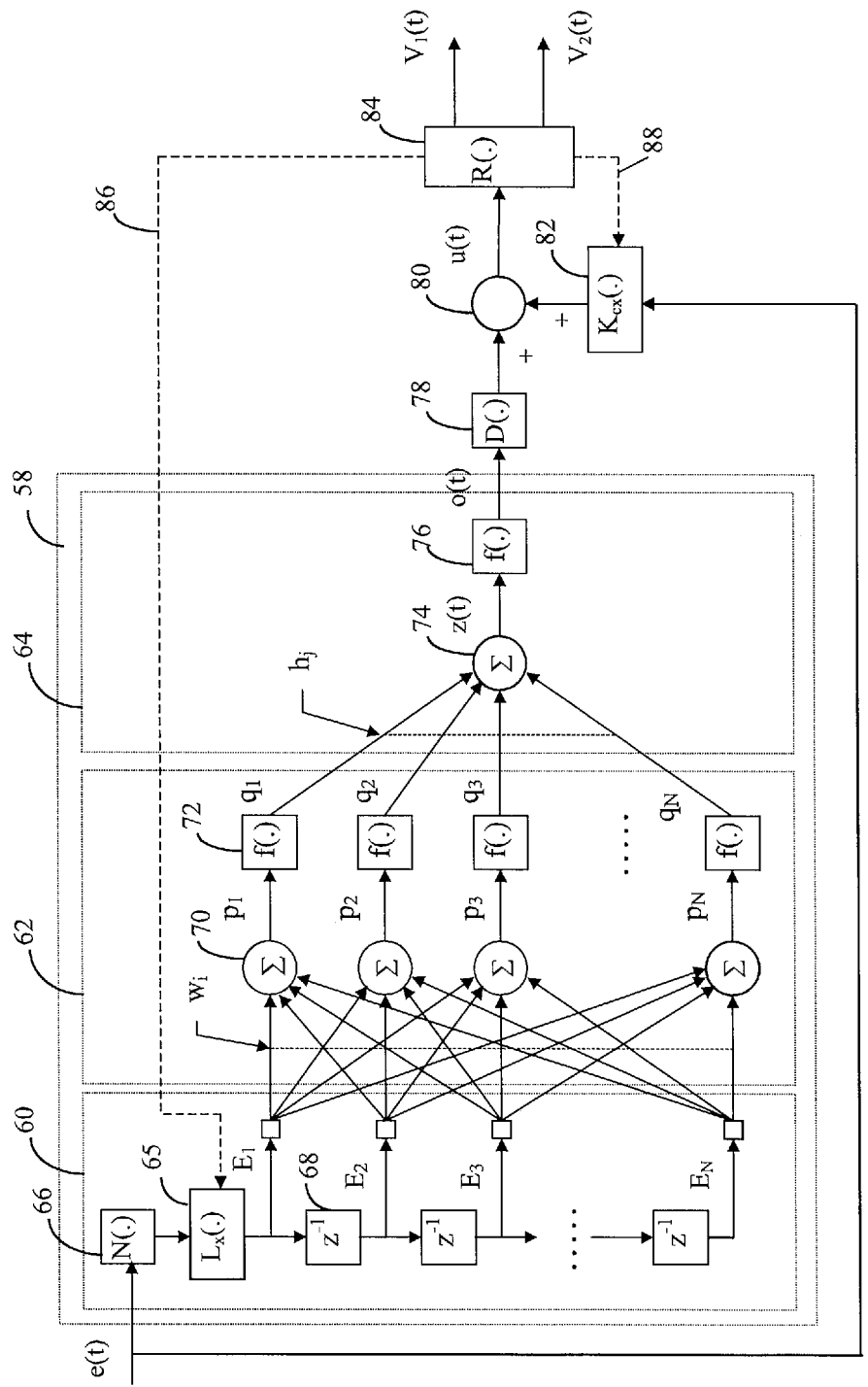
FIG. 5 illustrates the architecture of a 1-Input-2-Output Model-Free Adaptive (MFA) controller to control the chamber pressure of the EVC apparatus, according to an embodiment of this invention.

FIG. 5 illustrates the architecture of a 1-Input-2-Output Model-Free Adaptive (MFA) controller to control the chamber pressure of the EVC apparatus, according to an embodiment of this invention. A linear multi-layer neural network 58 is used in the design of the controller. The neural network has one input layer 60, one hidden layer 62 with N neurons, and one output layer 64 with one neuron.

The input signal e(t) to the input layer 60 is first converted to a normalized error signal $E_1$ with a range of −1 to 1 by using the normalization unit 66, where N(.) denotes a normalization function. The output of the normalization unit 66 is then scaled by a scaling function $L_x$(.) 65:

$$L_x(\cdot) = \frac{K_{c_x}}{T_{c_x}}. \qquad (2)$$

The value of $E_1$ at time t is computed with function $L_x(.)$ and $N(.)$:

$$E_1 = \frac{K_{c_x}}{T_{c_x}} N(e(t)), \quad (3)$$

where $K_{cx} > 0$ is defined as controller gain and $T_{cx}$ is the user selected process time constant. $K_{cx}$ is used to compensate for the process steady-state gain and $T_{cx}$ provides information for the dynamic behavior of the process. When the error signal is scaled with these parameters, the controller behavior can be manipulated by adjusting the parameters.

The $E_1$ signal then goes iteratively through a series of delay units 68, where $z^{-1}$ denotes the unit delay operator. A set of normalized and scaled error signals $E_2$ to $E_N$ is then generated. In this way, a continuous signal e(t) is converted to a series of discrete signals, which are used as the inputs to the neural network. These delayed error signals $E_i$, i=1, . . . N, are then conveyed to the hidden layer through the neural network connections. This is equivalent to adding a feedback structure to the neural network. Then the regular static multi-layer neural network becomes a dynamic neural network. A Model-Free Adaptive controller uses a dynamic block such as a dynamic neural network. A dynamic block is just another name for a dynamic system, whose inputs and outputs have dynamic relationships.

Each input signal can be conveyed separately to each of the neurons in the hidden layer 62 via a path weighted by an individual weighting factor $w_{ij}$, where i=1, 2, . . . N, and j=1, 2, . . . N. The inputs to each of the neurons in the hidden layer are summed by adder 70 to produce signal $p_j$. Then the signal $p_j$ is filtered by an activation function 72 to produce $q_j$, where j denotes the jth neuron in the hidden layer.

A piecewise continuous linear function $f(x)$ mapping real numbers to [0, 1] is used as the activation function in the neural network as defined by $$f(x) = 0, \text{ if } x < -\frac{b}{a} \quad (4a)$$

$$f(x) = ax + b, \text{ if } -\frac{b}{a} \leq x \leq \frac{b}{a} \quad (4b)$$

$$f(x) = 1, \text{ if } x > \frac{b}{a} \quad (4c)$$

where a is an arbitrary constant and b=½.

Each output signal from the hidden layer is conveyed to the single neuron in the output layer 64 via a path weighted by an individual weighting factor $h_j$, where j=1, 2, . . . N. These signals are summed in adder 74 to produce signal z(.), and then filtered by activation function 76 to produce the output o(.) of the neural network 58 with a range of 0 to 1.

A de-normalization function 78 defined by $$D(x) = 100x, \quad (5)$$

maps the o(.) signal back into the real space to produce the controller signal u(t).

The algorithm governing the input-output of the controller consists of the following difference equations:

$$p_j(n) = \sum_{i=1}^{N} w_{ij}(n) E_i(n), \quad (6)$$

$$q_j(n) = f(p_j(n)), \quad (7)$$

$$o(n) = f\left(\sum_{j=1}^{N} h_j(n) q_j(n)\right), \quad (8)$$

$$= a \sum_{j=1}^{N} h_j(n) q_j(n) + b,$$

where the variable of function f(.) is in the range specified in Equation (4b), and o(n) is bounded by the limits specified in Equations (4a) and (4c). Through adder 80, the controller signal u(t) becomes $$u(t) = K_{cx}(\cdot) e(t) + D(o(t)) \quad (9)$$

$$= K_{cx}(\cdot) e(t) + 100 \left[ a \sum_{j=1}^{N} h_j(n) q_j(n) + b \right],$$

where n denotes the nth iteration; o(t) is the continuous function of o(n); D(.) is the de-normalization function; and $K_{cx}(.) > 0$, the controller gain 82, is a variable used to adjust the magnitude of the controller. This is the same variable as in the scaling function $L_x(.)$ 65 and is useful to fine tune the controller performance or keep the system stable. The controller signal u(t) then goes into a split-range setter R(.) 84 to produce the controller outputs $V_1(t)$ and $V_2(t)$.

An online learning algorithm as described in the U.S. Pat. No. 6,556,980 B1 is an example of one algorithm that can be used to continuously update the values of the weighting factors of the MFA controller as follows:

$$\Delta w_{ij}(n) = a^2 \eta e(n) E_i(n) h_j(n), \quad (10)$$

$$\Delta h_j(n) = a \eta e(n) q_j(n). \quad (11)$$

The equations (1) through (11) work for both process direct-acting or reverse acting types. Direct-acting means that an increase in the process input will cause its output to increase, and vice versa. Reverse-acting means that an increase in the process input will cause its output to decrease, and vice versa. To keep the above equations working for both direct and reverse acting cases, e(t) is calculated differently based on the acting type of the process as follows:

$$e(t) = r(t) - y(t), \text{ if direct acting} \quad (12a)$$

$$e(t) = -[r(t) - y(t)], \text{ if reverse acting} \quad (12b)$$

In order to control the chamber pressure of the EVC apparatus, the split-range setter R(.) 84 needs to be designed to produce the controller outputs $V_1(t)$ and $V_2(t)$ to achieve good control performance and deal with varying food types, payload changes, and other uncertainties.

Figure 6:
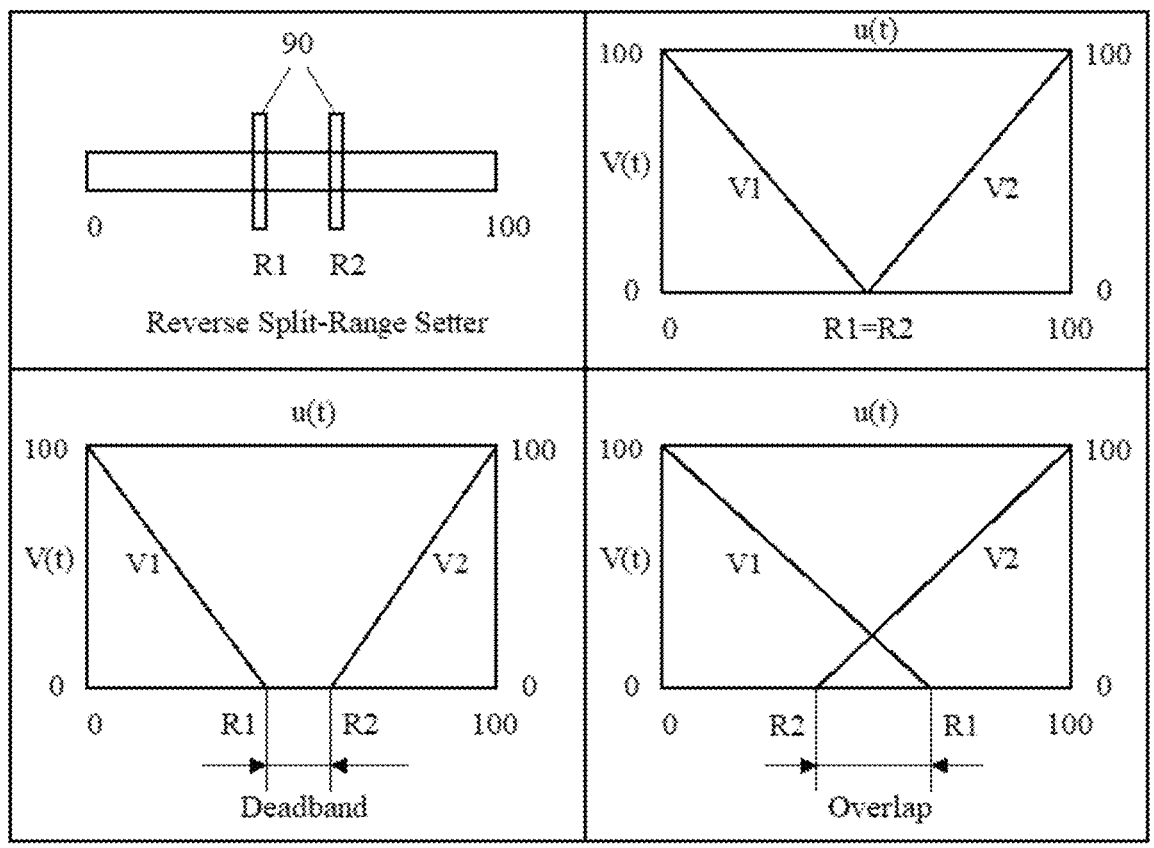
FIG. 6 is a drawing illustrating a mechanism of a reverse split-range setter that can split the controller signal into 2 ranges to manipulate the vacuum control valve and inflow air control valve, according to an embodiment of this invention.

FIG. 6 is a drawing illustrating a mechanism of a reverse split-range setter that can split the controller signal into 2 ranges to manipulate the vacuum control valve and inflow air control valve, according to an embodiment of this invention.

By moving and setting the knobs $R_1$ and $R_2$ 90, respectively, the controller outputs $V_1(t)$ and $V_2(t)$ are calculated based on the following formulas as implemented in the split-range setter mechanism 90:

$$V_1(t) = -100\frac{u(t)}{R_1} + 100, \text{ for all } u(t) \in [0, R_1] \quad (13a)$$

$$V_1(t) = 0, \text{ for all } u(t) \in (R_1, 100] \quad (13b)$$

where $0 < R_1 < 100$, which defines the split range of $u(t)$ for controller output $V_1(t)$; and $$V_2(t) = -100\frac{u(t) - 100}{R_2 - 100} + 100, \text{ for all } u(t) \in [R_2, 100] \quad (14a)$$

$$V_2(t) = 0, \text{ for all } u(t) \in [0, R_2) \quad (14b)$$

where $0 < R_2 < 100$, which defines the split range of $u(t)$ for controller output $V_2(t)$. The signals $u(t)$, $V_1(t)$, and $V_2(t)$ all have a working range of 0% to 100%. In this design, the control valves are shut at 0% during their off position. We can move and set the $R_1$ and $R_2$ knobs freely within its (0, 100) range to produce controller outputs $V_1(t)$, and $V_2(t)$, where there may be a deadband, or an overlap, or no gaps in between.

In EVC apparatus chamber pressure control, there are 3 working conditions:
(1) the vacuum control valve is open and inflow air flow valve is closed, chamber pressure is decreasing;
(2) both vacuum control valve and inflow air control valve are closed, chamber pressure is holding steady; and
(3) the vacuum control valve is closed and inflow air flow valve is open, chamber pressure is increasing.

Then, we can move and set the $R_1$ and $R_2$ knobs to have an adequate deadband to support all 3 working conditions. For instance, we can set the $R_1$=40, and $R_2$=60. When $u(t) < 40$, the vacuum control valve is open to move air out of the chamber causing the chamber pressure to decrease. Inside the deadband, where $40 < u(t) < 60$, $V_1(t) = V_2(t) = 0$ forcing both control valves to be closed. When $u(t) > 60$, the inflow air control valve is open. Clean air flows into the chamber causing the pressure to increase.

U.S. Pat. No. 7,142,626 also described 2×1 and M×1 PID (Proportional-Integral-Derivative) control systems which could potentially be useful for chamber pressure control for the EVC apparatus.

C. Design of Chamber Pressure Setpoint Trajectory for the EVC Apparatus

As defined in the opening section of this specification, Extreme Vacuum Cooling (EVC) is vacuum cooling at extremely low pressure conditions with vacuum chamber pressure control and added clean dry air or inert gas. The EVC apparatus disclosed in this patent can cool food uniformly and rapidly.

One major challenge for the EVC apparatus is the potential liquid splash for Type B Foods. When the pressure difference between the chamber pressure and vapor pressure of water inside the food is too high, excessive bubbling can occur due to rapid evaporation. For low viscosity foods, such as soups and sauces, this liquid splash can be a big issue for the users. It is important to control the chamber pressure carefully for Type B Food so that the pressure difference between the chamber pressure and vapor pressure is managed in an automated way to enable rapid cooling but have no liquid splash events.

Figure 7:
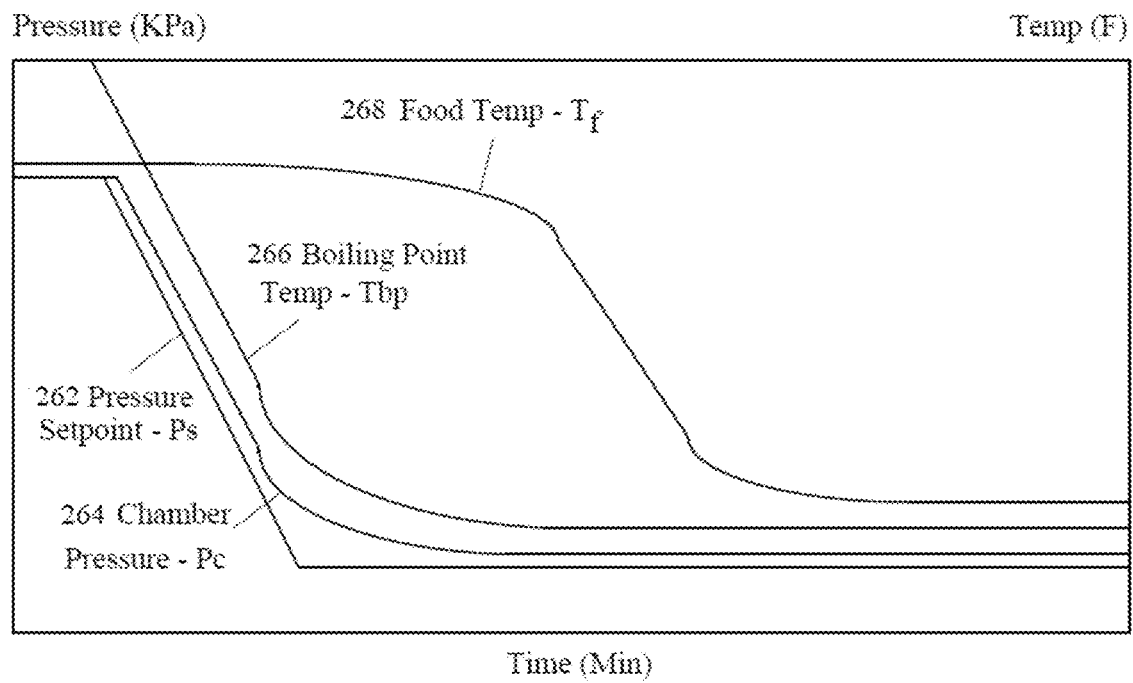
FIG. 7 is a time-amplitude diagram that shows a pressure setpoint trajectory, controlled chamber pressure of the EVC apparatus, boiling point temperature at such chamber pressure, and food temperature, according to an embodiment of this invention.

FIG. 7 is a time-amplitude diagram that shows a pressure setpoint trajectory, controlled chamber pressure of the EVC apparatus, boiling point temperature relating to the chamber pressure, and food temperature, according to an embodiment of this invention for Type A Food. The diagram comprises trends for the pressure setpoint Ps 102, chamber pressure Pc 104, boiling point temperature Tbp 106, and food temperature Tf 108.

Since the liquid splash events do not happen for Type A Food, we can reduce the vacuum pressure more aggressively based on the capability of the EVC apparatus. For instance, the vacuum pressure setpoint Ps 102 can be designed to change from atmosphere pressure (1.0 ATM or 100 KPa) to extremely low pressure (0.01 ATM or about 1.0 KPa) to achieve rapid vacuum cooling. The chamber pressure Pc 104 can be controlled to track its setpoint Ps. In this case, the 1×2 pressure controller described in Section B will work in its OP range between 0 to 40 to manipulate the vacuum control valve and achieve pressure control, while the inflow air control valve is closed.

The boiling point of a substance is the temperature at which the vapor pressure of a liquid equals the pressure surrounding the liquid while the liquid changes into a vapor. Therefore, in the vacuum chamber, the boiling point temperature of water inside the food is directly related to the chamber pressure. It can be seen that the boiling point temperature Tbp 106 of the water inside the food varies along with the chamber pressure Pc 104. Please note that there is a time lag between Tbp 106 and Tf 108. For Type A Food, this temperature difference is not an issue. However, for Type B Food, if we run the EVC apparatus based on this designed the pressure setpoint, the big temperature difference of Tbp and Tf can cause liquid splash.

Figure 8:
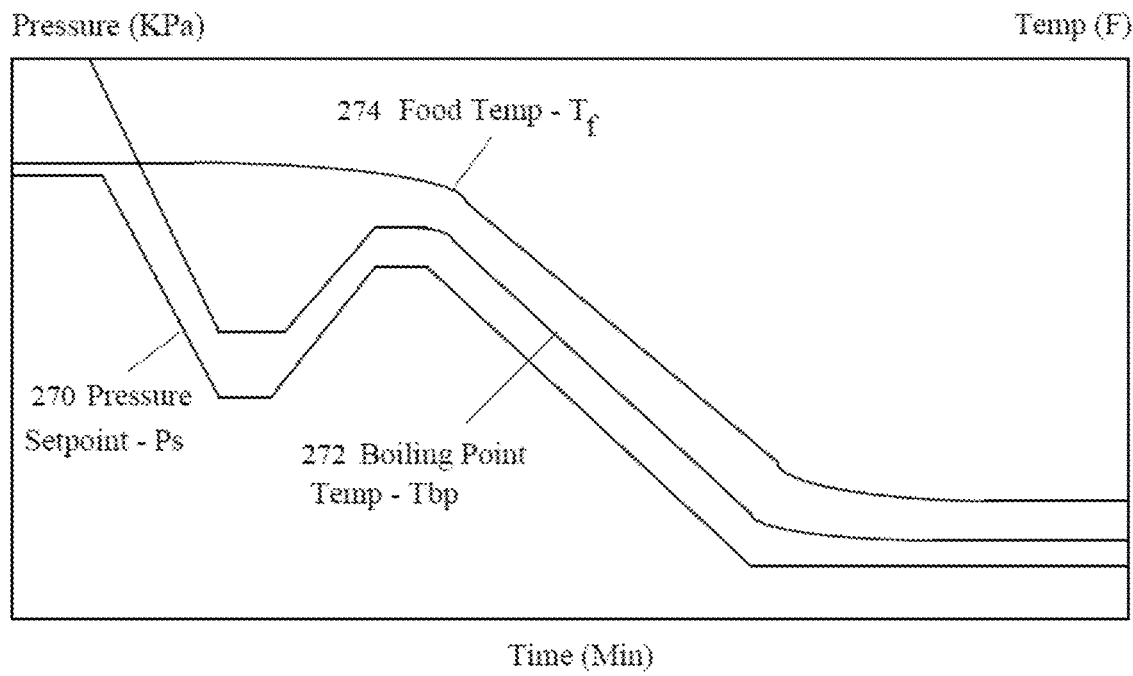
FIG. 8 is a time-amplitude diagram that shows a pressure setpoint trajectory that goes up and down intentionally, boiling point temperature at such chamber pressure, and food temperature, according to an embodiment of this invention.

FIG. 8 is a time-amplitude diagram that shows a pressure setpoint trajectory that goes up and down intentionally, boiling point temperature at such chamber pressure, and food temperature, according to an embodiment of this invention for Type B Food.

As explained in the opening section of this document, if the pressure difference between the chamber pressure and vapor pressure of water inside the food is too high, excessive bubbling can occur due to rapid evaporation. When the bubbles burst at the food surface, the force of the bubble surface tension can cause the liquid splash inside the chamber for Type B Food. It is important to control the chamber pressure carefully for Type B Food so that the pressure difference between the chamber pressure and vapor pressure is managed in such a way that enables rapid cooling but avoids liquid splash events.

Since the boiling point temperature has a direct relationship with the chamber pressure, we can also control the chamber pressure with constraints based on the difference between the boiling point temperate and food temperature to avoid liquid splash for Type B Food. As illustrated in FIG. 8, the chamber pressure setpoint Ps 110 can be reduced at the beginning to give a kick start for vacuum cooling. In this drawing, the measured chamber pressure is not shown but should track the pressure setpoint. In this case, we can assume the chamber pressure is equivalent to the pressure setpoint. The boiling point temperature Tbp 112 comes down along with the chamber pressure. Then, we can increase the pressure by adding clean dry air or inert gas into the chamber to reach a level before the food temperature Tf 114 starts to fall. The goal of adding clean air is to raise the chamber pressure and maintain a temperature difference between Tbp and Tf so that liquid splash will not happen.

As illustrated in FIG. 4, the chamber pressure setpoint trajectory can be calculated based on vapor pressure, boiling point temperature, and viscosity. The formulas to calculate vapor pressure and boiling point temperature relating to viscosity that can be used in this embodiment are any of known techniques described in the book Perry's Chemical Engineers' Handbook, by Don Green and Marylee Z. Southard, published by McGraw-Hill Education, which book and its contents are herein expressly incorporated by reference, in their entirety.

Without losing generality, we can design the chamber pressure setpoint Ps(t) for Type B Food based on the following formula, which is illustrated in FIG. 8:

| | | |
|---|---|---|
| Ps(t) = Pi(0) − a*t; | During initial ramp down period; | (15a) |
| Ps(t) = C1; | During the first holding period; | (15b) |
| Ps(t) = C1 + b*t; | During the ramp up period; | (15c) |
| Ps(t) = C2; | During the second holding period; | (15d) |
| Ps(t) = C2 − d*t; | During the second ramp down; | (15e) |
| Ps(t) = C3, | During the endpoint period. | (15d) |

In these formulas, Pi(0) is the initial value of the chamber pressure, constants a, b, and d are the slopes of pressure ramp down, ramp up, and final ramp down. Constants C1, C2, and C3 are the pressure setpoints for the EVC apparatus to run at a fixed vacuum pressure. The actual values of the slopes and constants are related to the EVC apparatus capability, food viscosity, total weight, and the difference between boiling point temperature and food temperature, etc. They can be derived through experiments and stored in cooling recipes as pre-determined values.

D. Methods of Extreme Vacuum Cooling

Figure 9:
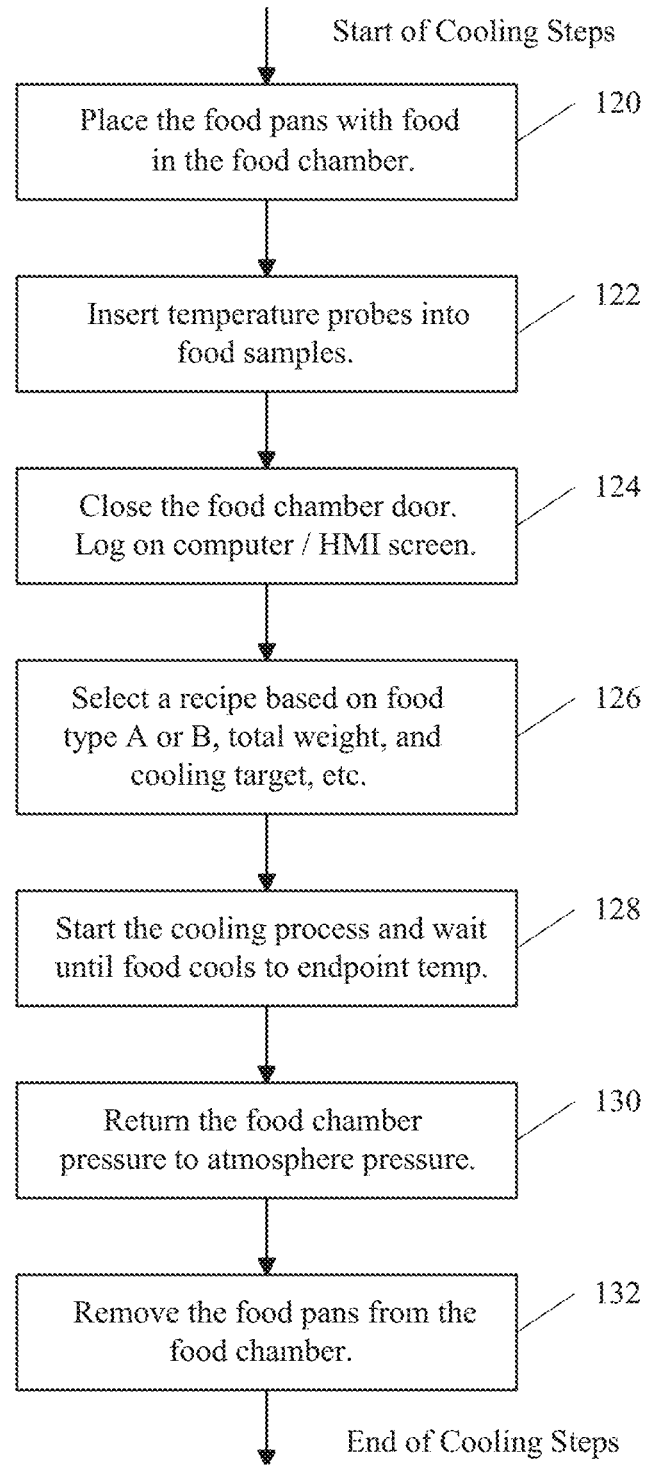
FIG. 9 is a block diagram illustrating the steps of a method for cooling foods using the EVC apparatus illustrated in FIGS. 1 to 8, according to an embodiment of this invention.

FIG. 9 is a block diagram illustrating the steps of a method for cooling foods using the EVC apparatus illustrated in FIGS. 1 to 8, according to an embodiment of this invention.

The cooling steps start at Block 120, where food pans with food for cooling are placed inside the food chamber of the EVC apparatus. At Block 122, multiple temperature sensor probes are inserted into food samples for food temperature measurement. An average value can be used as food temperature Tf for temperature monitoring, endpoint temperature triggering, and chamber pressure setpoint calculation.

At Block 124, the operator closes the chamber door, and then logs onto the computer or HMI screen. At Block 126, a cooling recipe is selected from a Recipe Selection Menu relating to Food Type A or B, total weight of the food inside the chamber, and cooling target, etc. The chamber pressure setpoint trajectory calculation is very much related to the Food Type A or B as illustrated in FIGS. 7 and 8.

At Block 128, the operator starts the cooling process and waits until the food cools to the endpoint temperature. At Block 130, the cooling process is finished and the food chamber pressure is returned to atmosphere pressure. At Block 132, the food pan is removed from the food chamber.

E. Conclusion

The motivation to develop Extreme Vacuum Cooling (EVC) technology and products fits the mega trend of the food industry transformation. Similar to a semiconductor foundry or fab, a food foundry is a modern commercial kitchen or food processing plant that can produce large amounts of food with special recipes in small packages to serve dedicated or targeted customer groups. In a food fab, the large amount of food needs to be cooked and chilled for future consumption. Chilling food rapidly to get cooked food out of danger zones, meet food safety standards, save energy and manpower are the objectives of this invention.

The inventors of this patent have many years of experience in technology innovation to serve or even lead the mega trends in the transformation in industrial automation, renewable energy, and semiconductor equipment. It is our goal to contribute to and support the food industry and our society where people are looking for healthier, more flavorful, and affordable foods.

The invention claimed is:

1. An apparatus for cooling food capable of operating at extremely low pressure conditions, comprising:
   a) a food chamber being able to work in extremely low pressure conditions and having multiple racks to hold food pans or trays;
   b) a vacuum pump arranged to pump air out of the food chamber to reach extremely low pressure conditions;
   c) a cold trap arranged to condense water vapor from the food chamber back to liquid form;
   d) a vacuum control valve arranged to isolate the vacuum pump and cold trap, and to regulate the exhaust air flow;
   e) an inflow air control valve arranged to regulate the added clean air flows and serve as a vent valve to allow the food chamber to get back to atmosphere pressure;
   f) an electrical panel arranged to receive electric power and supply the power to the apparatus;
   g) a computer and control device that allows the user to operate the apparatus; and
   h) a food chamber pressure control system, wherein the food chamber pressure control system is a 2-Input-1-Output (2×1) pressure control system and further comprises a 1-input-2-output (1×2) pressure controller and a 2-input-1-output (2×1) pressure system, wherein the pressure control system is adapted to calculate a pressure setpoint trajectory.

2. The apparatus of claim 1, in which the extremely low pressure conditions have chamber pressure being less than or equal to about 0.1 ATM or 10 kPa.

3. The apparatus of claim 1, further comprising:
   a) an inline air filter to filter the inflow air; and
   b) a refrigeration unit being used to cool down the cold trap.

4. The apparatus of claim 1, further comprising:
   a) a plurality of temperature sensors whose probes can be inserted into food samples in food pans to measure food temperatures;
   b) a humidity sensor being used to measure the humidity of the food chamber; and
   c) a pressure sensor being used to measure the pressure of the food chamber.

5. The apparatus of claim 1, wherein the electrical panel is for single-phase AC or three-phase AC power.

6. The apparatus of claim 1, wherein the 1-input-2-output (1×2) pressure controller is a Model-Free Adaptive (MFA) controller, comprising a split-range setter to produce control output 1 and 2 to manipulate actuator 1 and 2.

7. The apparatus of claim 1, wherein the 1-input-2-output (1×2) pressure controller is a Proportional-Integral-Derivative (PID) controller, comprising a split-range setter to produce control output 1 and 2 to manipulate actuator 1 and 2.

8. The apparatus of claim 6, in which the split-range setter produces controller outputs of the form:

$$V_1(t) = -100\frac{u(t)}{R_1} + 100, \text{ for all } u(t) \in [0, R_1]$$

$$V_1(t) = 0, \text{ for all } u(t) \in [R_1, 100]$$

-continued $$V_2(t) = -100\frac{u(t) - 100}{R_2 - 100} + 100, \text{ for all } u(t) \in [R_2, 100]$$

$V_2(t) = 0$, for all $u(t) \in [0, R_2)$ or an equivalent thereof, in which $0<R_1\leq100$, $0\leq R_2<100$, the signals u(t), $V_1$(t), and $V_2$(t) all having a working range of 0 to 100.

9. The apparatus of claim 8, in which the split-range setter includes individual controls that can be set freely within the split range to produce controller outputs $V_1$(t), and $V_2$(t) that provide a deadband between the controller outputs, an overlap thereof, or a continuum from one to the other.

10. The apparatus of claim 8, in which the controller outputs $V_1$(t) and $V_2$(t) are arranged to include selectable control limits or control constraints.

11. The apparatus of claim 8, in which the split-range setter is set with the values of R1 and R2 to enable three working conditions, in which:
   (a) vacuum control valve is open and inflow air flow valve is closed, chamber pressure is decreasing;
   (b) both vacuum control valve and inflow air control valve are closed, chamber pressure is holding steady; and
   (c) vacuum control valve is closed and inflow air flow valve is open, chamber pressure is increasing.

12. The apparatus of claim 11, in which the split-range setter is set with R1=40 and R2=60.

13. The apparatus of claim 1, in which the pressure setpoint trajectory is calculated in the following form:

| | |
|---|---|
| Ps(t) = Pi(0) − a*t; | During initial ramp down period; |
| Ps(t) = C1; | During the first holding period; |
| Ps(t) = C1 + b*t; | During the ramp up period; |
| Ps(t) = C2; | During the second holding period; |
| Ps(t) = C2 − d*t; | During the second ramp down period; |
| Ps(t) = C3, | During the endpoint period; | or an equivalent thereof, in which Pi(0)>0 is the initial chamber pressure, and a>0, b>0, d>0, C1>0, C2>0, C3>0 are pre-determined constants being used in cooling recipes.

14. A chamber pressure control system comprising:
a) a 1-input-2-output (1x2) pressure controller;
b) a 2-input-1-output (2x1) pressure system;
c) a first actuator being the vacuum control valve; and
d) a second actuator being the inflow air control valve;
wherein the pressure control system is adapted to calculate a pressure setpoint trajectory in the following form:

| | |
|---|---|
| Ps(t) = Pi(0) − a*t; | During initial ramp down period; |
| Ps(t) = C1; | During the first holding period; |
| Ps(t) = C1 + b*t; | During the ramp up period; |
| Ps(t) = C2; | During the second holding period; |
| Ps(t) = C2 − d*t; | During the second ramp down period; |
| Ps(t) = C3, | During the endpoint period; | or an equivalent thereof, in which Pi(0)>0 is the initial chamber pressure, and a>0, b>0, d>0, C1>0, C2>0, C3>0 are pre-determined constants being used in cooling recipes.

15. A method of cooling food using an extreme vacuum cooling apparatus having a food chamber, comprising:
   a) Placing the food pan with food inside the food chamber;
   b) Inserting temperature sensor probes into food samples for measuring the food temperature;
   c) Calculating an average value for the food temperature;
   d) Closing the chamber door;
   e) Logging on the computer or HMI screen;
   f) Selecting a cooling recipe from a recipe selection menu based on food type and total weight;
   g) Starting the cooling process, where the chamber pressure is controlled based on a pre-determined pressure setpoint trajectory, the pressure setpoint trajectory being used for cooling liquid types of food with low viscosity;
   h) Waiting for a predetermined wait time;
   i) Returning the food chamber pressure to atmosphere pressure;
   j) Opening the chamber door; and
   k) Removing the food pan from the food chamber;
   wherein the pressure setpoint trajectory is calculated in the following form:

| | |
|---|---|
| Ps(t) = Pi(0) − a*t; | During initial ramp down period; |
| Ps(t) = C1; | During the first holding period; |
| Ps(t) = C1 + b*t; | During the ramp up period; |
| Ps(t) = C2; | During the second holding period; |
| Ps(t) = C2 − d*t; | During the second ramp down period; |
| Ps(t) = C3, | During the endpoint period; | or an equivalent thereof, in which Pi(0)>0 is the initial chamber pressure, and a>0, b>0, d>0, C1>0, C2>0, C3>0 are pre-determined constants being used in cooling recipes.

16. The method of claim 15, wherein the cooling recipe includes a predetermined extremely low pressure condition where the chamber pressure is reduced to 0.01 ATM (1 kPa) or less.

* * * * *